(12) United States Patent
Kagawa (10) Patent No.: US 10,026,444 B2
(45) Date of Patent: Jul. 17, 2018

(54) RECORDING TAPE CARTRIDGE CONFIGURED TO SUPPRESS DAMAGE TO GUIDE WALL PORTIONS THAT ARE ORTHOGONAL TO A LOADING DIRECTION

(71) Applicant: FUJIFILM CORPORATION, Minato-ku, Tokyo (JP)

(72) Inventor: Yusuke Kagawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/679,155

(22) Filed: Aug. 17, 2017

(65) Prior Publication Data

US 2018/0090169 A1 Mar. 29, 2018

(30) Foreign Application Priority Data

Sep. 29, 2016 (JP) .................................. 2016-192048

(51) Int. Cl.
*G11B 23/107* (2006.01)
*G11B 23/04* (2006.01)

(52) U.S. Cl.
CPC .......... *G11B 23/043* (2013.01); *G11B 23/044* (2013.01); *G11B 23/045* (2013.01); *G11B 23/047* (2013.01); *G11B 23/048* (2013.01); *G11B 23/107* (2013.01)

(58) Field of Classification Search
None
See application file for complete search history.

(56) References Cited

U.S. PATENT DOCUMENTS

| | | | | |
|---|---|---|---|---|
| 2005/0184179 A1* | 8/2005 | Hiraguchi | ............ | G11B 23/043 242/338.1 |
| 2005/0184180 A1* | 8/2005 | Hiraguchi | ............ | G11B 23/043 242/338.1 |
| 2005/0184181 A1* | 8/2005 | Hiraguchi | ............ | G11B 23/043 242/338.1 |
| 2005/0184182 A1* | 8/2005 | Hiraguchi | ............ | G11B 23/043 242/338.1 |

(Continued)

FOREIGN PATENT DOCUMENTS

JP 4927044 B2 5/2012

*Primary Examiner* — Craig A. Renner
(74) *Attorney, Agent, or Firm* — SOLARIS Intellectual Property Group, PLLC (57) ABSTRACT

A recording tape cartridge includes two first guide wall portions formed in a direction orthogonal to a loading direction of the case into a drive device and between which a first protruding wall portion formed at a brake member is insertable, and two second guide wall portions and two third guide wall portions formed at regular intervals from the first guide wall portions in a circumferential direction. A second protruding wall portion at the brake member is insertable between the second guide wall portions, and a third protruding wall portion at the brake member is insertable between the third guide wall portions. An interval, α, between each first guide wall portion and the first protruding wall portion, and an interval, β, between each second guide wall portion and the second protruding wall portion and between each third guide wall portion and the third protruding wall portion satisfy "α≥2×β".

10 Claims, 8 Drawing Sheets

(56) References Cited

U.S. PATENT DOCUMENTS

| | | | |
|---|---|---|---|
| 2005/0211813 A1* | 9/2005 | Hiraguchi | G11B 23/043 242/338.1 |
| 2006/0169819 A1* | 8/2006 | Hiraguchi et al. | G11B 23/037 242/348.2 |
| 2006/0231659 A1* | 10/2006 | Hiraguchi | G11B 23/107 242/338.1 |
| 2007/0023556 A1* | 2/2007 | Hiraguchi | G11B 23/043 242/343 |
| 2010/0038465 A1* | 2/2010 | Takenoshita | G11B 23/027 242/348 |
| 2010/0038466 A1* | 2/2010 | Takenoshita et al. | G11B 23/043 242/348.3 |
| 2010/0059617 A1* | 3/2010 | Takenoshita et al. | G11B 23/027 242/348.3 |

* cited by examiner

RECORDING TAPE CARTRIDGE CONFIGURED TO SUPPRESS DAMAGE TO GUIDE WALL PORTIONS THAT ARE ORTHOGONAL TO A LOADING DIRECTION

CROSS-REFERENCE TO RELATED APPLICATION

This application claims priority under 35 USC 119 from Japanese Patent Application No. 2016-192048 filed Sep. 29, 2016, the disclosure of which is incorporated by reference herein in its entirety.

BACKGROUND OF THE INVENTION

1. Field of the Invention

The present disclosure relates to a recording tape cartridge of which a single reel around which a recording tape is wound is housed in a case.

2. Description of the Related Art

A recording tape cartridge includes a brake member that is moved to a rotation-locking release position (a rotation allowing position) from a rotation-locking position in the direction of the rotation axis of a reel in a case in which the recording tape cartridge is loaded into a drive device. The brake member includes three protruding wall portions that are arranged on the upper surface thereof at an interval of 120°, and is adapted not to be capable of being rotated relative to an upper case in a case in which each of the protruding wall portions is inserted between each of three sets of two guide wall portions that are formed at an interval of 120° on the inner surface of the top plate of the upper case.

The recording tape cartridge, which includes three locking members arranged at an interval of 120° on the inner surface of the upper case, has been known in the past (for example, see JP4927044B). Engagement projections formed on the upper surface of the brake member are engaged with the locking members with the movement of the brake member to the rotation-locking release position from the rotation-locking position, so that the locking members slide toward the inside of the reel in the radial direction and release the position regulation of the reel in the direction of the rotation axis.

SUMMARY OF THE INVENTION

Incidentally, an operation for taking the recording tape cartridge out of a library device and loading the recording tape cartridge into a drive device and an operation for taking the recording tape cartridge out of the drive device and loading (receiving) the recording tape cartridge into the library device are repeatedly performed by a robot hand or the like. For this reason, in a case in which one locking member is disposed in a loading direction of the recording tape cartridge, the locking member slides inward in the radial direction by an inertial force at the time of loading the recording tape cartridge or taking out of the recording tape cartridge. As a result, there is a concern that the movement of the reel in the direction of the rotation axis may be unexpectedly allowed. Further, in a case in which the locking member slides inward in the radial direction whenever the locking member receives the inertial force, there is also a concern that the durability of coil spring biasing the locking member to the outside of the reel in the radial direction may deteriorate.

Accordingly, in such a recording tape cartridge, each locking member is disposed in a direction crossing the loading direction in plan view. However, in a case in which each locking member is disposed in a direction crossing the loading direction in plan view, one set of guide wall portions may be disposed in a direction orthogonal to the loading direction in plan view.

In a case in which one set of guide wall portions is disposed in a direction orthogonal to the loading direction in plan view, the weight of the reel (a load of about 60N) is intensively applied to the set of guide wall portions through the protruding wall portions of the brake member due to the movement of the reel in a direction parallel to the loading direction that is caused by the inertial force. For this reason, in a case in which an operation for loading the recording tape cartridge and an operation for taking the recording tape cartridge out are repeatedly performed, there is a concern that the set of guide wall portions may be subjected to fatigue failure (damage).

Accordingly, an object of the disclosure is to obtain a recording tape cartridge that can suppress damage to a set of two guide wall portions disposed in a direction orthogonal to a loading direction of the recording tape cartridge when seen in the direction of the rotation axis of a reel even though an operation for loading the recording tape cartridge into a drive device or an operation for taking the recording tape cartridge out of the drive device is repeatedly performed.

In order to achieve the above-mentioned object, a recording tape cartridge according to a first aspect of the disclosure comprises: a reel that includes a bottomed cylindrical hub around which a recording tape is wound and a reel gear that is configured to mesh with a drive gear provided at a drive device; a case that houses the reel; a brake member that is disposed inside the hub in a radial direction, that is moved in a direction of a rotation axis of the reel in conjunction with an operation for allowing the drive gear to mesh with the reel gear and an operation for releasing mesh between the drive gear and the reel gear, and that takes a rotation-locking release position at which the rotation of the reel is allowed and a rotation-locking position at which the rotation of the reel is prevented; a first protruding wall portion that protrudes from the brake member and that is disposed along a direction orthogonal to a loading direction in which the case is loaded into the drive device, and a second protruding wall portion and a third protruding wall portion that protrude from the brake member and that are disposed at regular intervals from the first protruding wall portion in a circumferential direction of the break member, when seen in the direction of the rotation axis of the reel; and a set of two first guide wall portions that is formed at an inner surface of a top plate of the case in the direction orthogonal to the loading direction in which the case is loaded into the drive device and between which the first protruding wall portion is insertable, and a set of two second guide wall portions and a set of two third guide wall portions that are formed at the inner surface of the top plate of the case at regular intervals from the first guide wall portions in the circumferential direction, the second protruding wall portion being insertable between the second guide wall portions, and the third protruding wall portion being insertable between the third guide wall portions, when seen in the direction of the rotation axis of the reel. In a case in which an interval between the each first guide wall portion and the first protruding wall portion is denoted by α and each of an interval between the each second guide wall portion and the second protruding wall portion and an interval between the each third guide wall portion and the third protruding wall portion is denoted by β, "α≥2×β" is satisfied.

Further, a recording tape cartridge according to a second aspect of the disclosure comprises: a reel that includes a bottomed cylindrical hub around which a recording tape is wound and a reel gear that is configured to mesh with a drive gear provided at a drive device; a case that houses the reel; a brake member that is disposed inside the hub in a radial direction, that is moved in a direction of a rotation axis of the reel in conjunction with an operation for allowing the drive gear to mesh with the reel gear and an operation for releasing mesh between the drive gear and the reel gear, and that takes a rotation-locking release position at which the rotation of the reel is allowed and a rotation-locking position at which the rotation of the reel is prevented; a first protruding wall portion that protrudes from the brake member and that is disposed along a direction orthogonal to a loading direction in which the case is loaded into the drive device, and a second protruding wall portion and a third protruding wall portion that protrude from the brake member and that are disposed at regular intervals from the first protruding wall portion in a circumferential direction of the break member, when seen in the direction of the rotation axis of the reel; and a set of two first guide wall portions that is formed at an inner surface of a top plate of the case in the direction orthogonal to the loading direction in which the case is loaded into the drive device and between which the first protruding wall portion is insertable and a set of two second guide wall portions and a set of two third guide wall portions that are formed at the inner surface of the top plate of the case at regular intervals from the first guide wall portions in the circumferential direction, the second protruding wall portion being insertable between the second guide wall portions, and the third protruding wall portion being insertable between the third guide wall portions, when seen in the direction of the rotation axis of the reel. In a case in which an interval between the each first guide wall portion and the first protruding wall portion is denoted by α, each of an interval between the each second guide wall portion and the second protruding wall portion and an interval between the each third guide wall portion and the third protruding wall portion is denoted by β, and each of inclination angles of the second and third guide wall portions with respect to the direction orthogonal to the loading direction in which the case is loaded into the drive device, when seen in the direction of the rotation axis of the reel, is denoted by θ, "α>β/cos θ" is satisfied.

According to the disclosure, it is possible to suppress damage to a set of two guide wall portions disposed in a direction orthogonal to a loading direction of the recording tape cartridge when seen in the direction of the rotation axis of a reel even though an operation for loading the recording tape cartridge into a drive device or an operation for taking the recording tape cartridge out of the drive device is repeatedly performed.

DESCRIPTION OF THE PREFERRED EMBODIMENTS

An embodiment according to the disclosure will be described in detail below with reference to the drawings. For convenience of description, in FIG. 1, a loading direction in which a recording tape cartridge 10 is loaded into a drive device (not shown) is indicated by an arrow A, and is referred to as a forward direction (front side) of the recording tape cartridge 10. Further, a direction of an arrow B orthogonal to the arrow A is referred to as a left direction (left side) of the recording tape cartridge 10. Further, a direction orthogonal to the direction of the arrow A and the direction of the arrow B is indicated by an arrow C and is referred to as an upward direction (upper side) of the recording tape cartridge 10. Furthermore, in the following description, there is a case in which the direction of the rotation axis of a reel 40 is simply referred to as "the direction of the rotation axis" and the radial direction of the reel 40 is simply referred to as "the radial direction".

Figure 1:
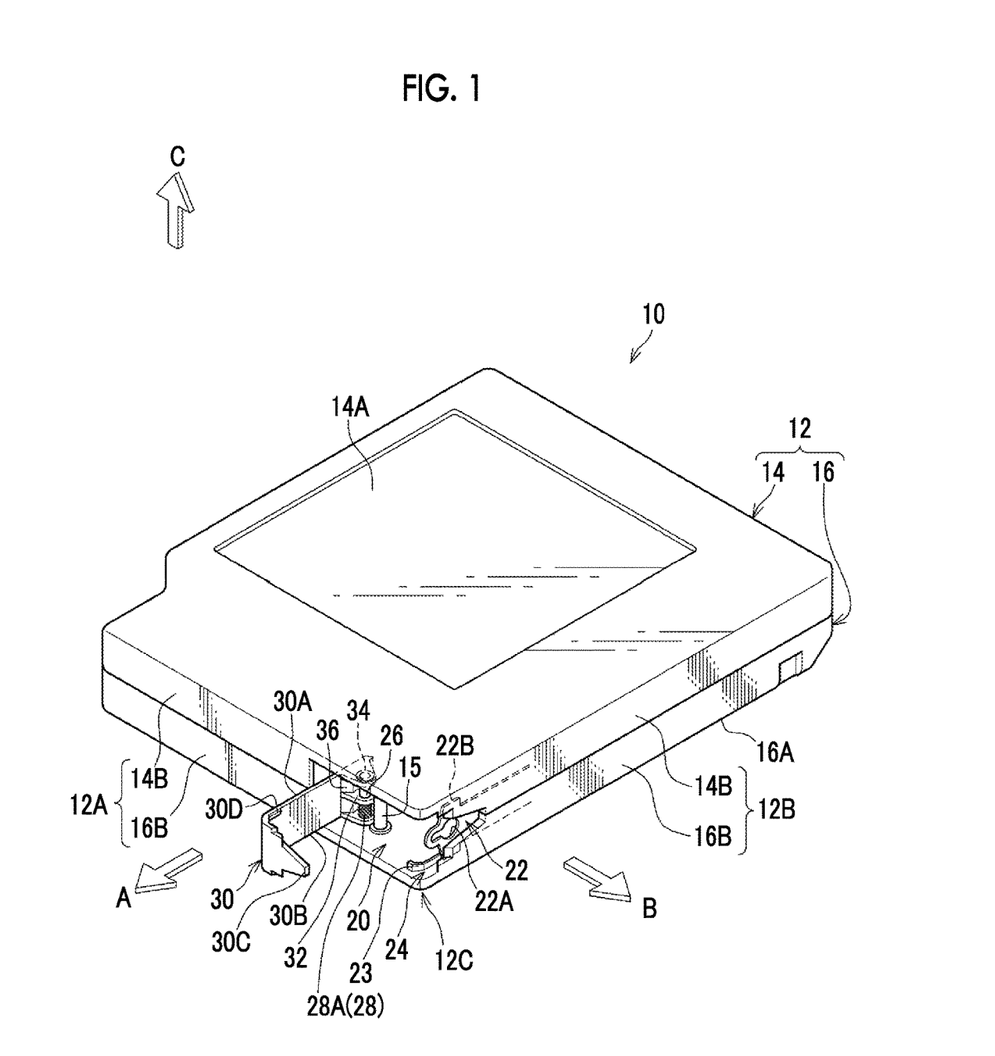
FIG. 1 is a perspective view of a recording tape cartridge according to an embodiment.

As shown in FIG. 1, the recording tape cartridge 10 includes a substantially rectangular box-shaped case 12. The case 12 has a structure in which upper and lower cases 14 and 16 made of a resin, such as polycarbonate (PC), are joined to each other by ultrasonic welding, screwing, or the like in a state in which peripheral walls 14B standing at the peripheral edges of a top plate 14A and peripheral walls 16B standing at the peripheral edges of a bottom plate 16A are in contact with each other.

Figure 2:
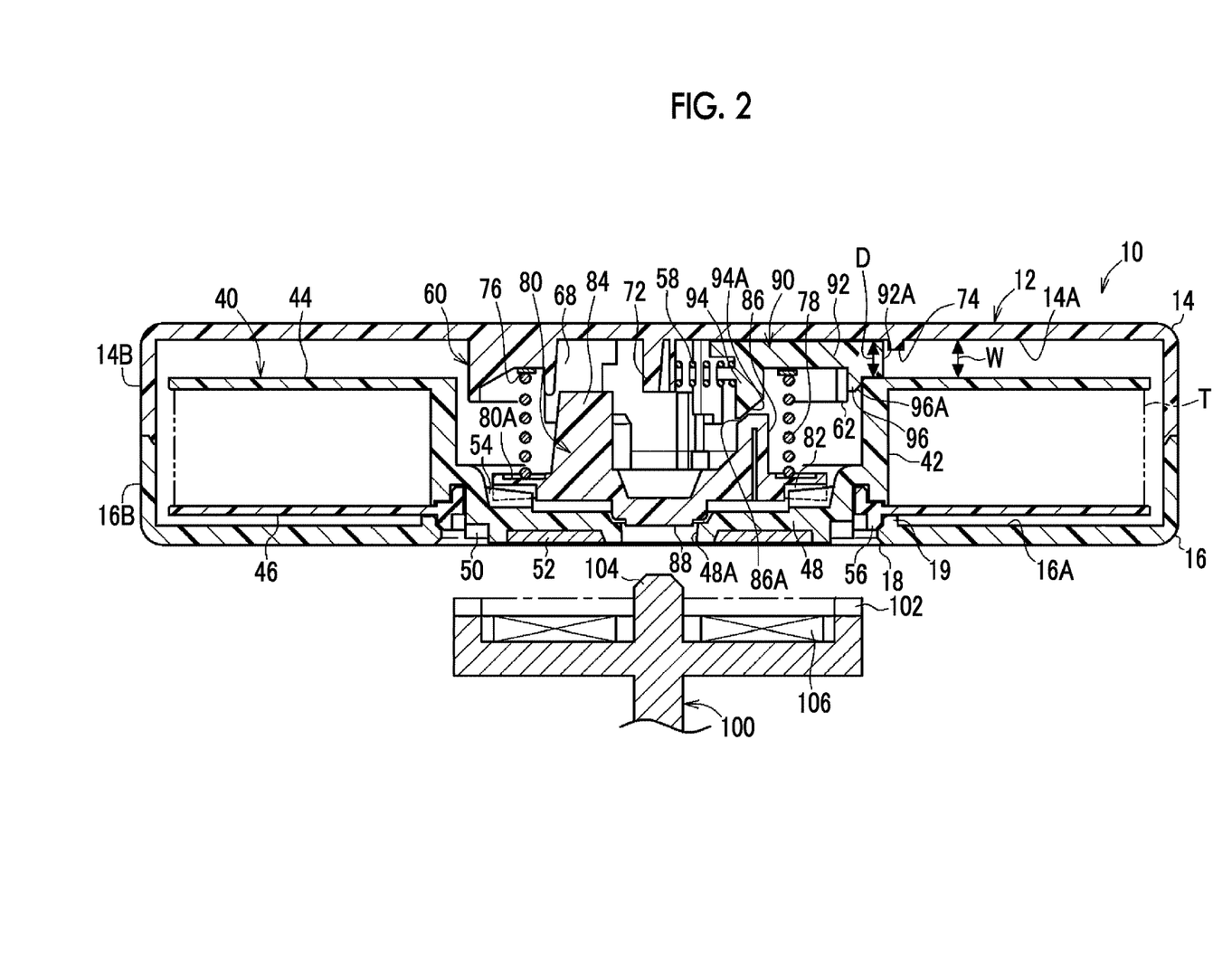
FIG. 2 is a side cross-sectional view of the recording tape cartridge in a case in which a rotating shaft does not yet rise.
Figure 3:
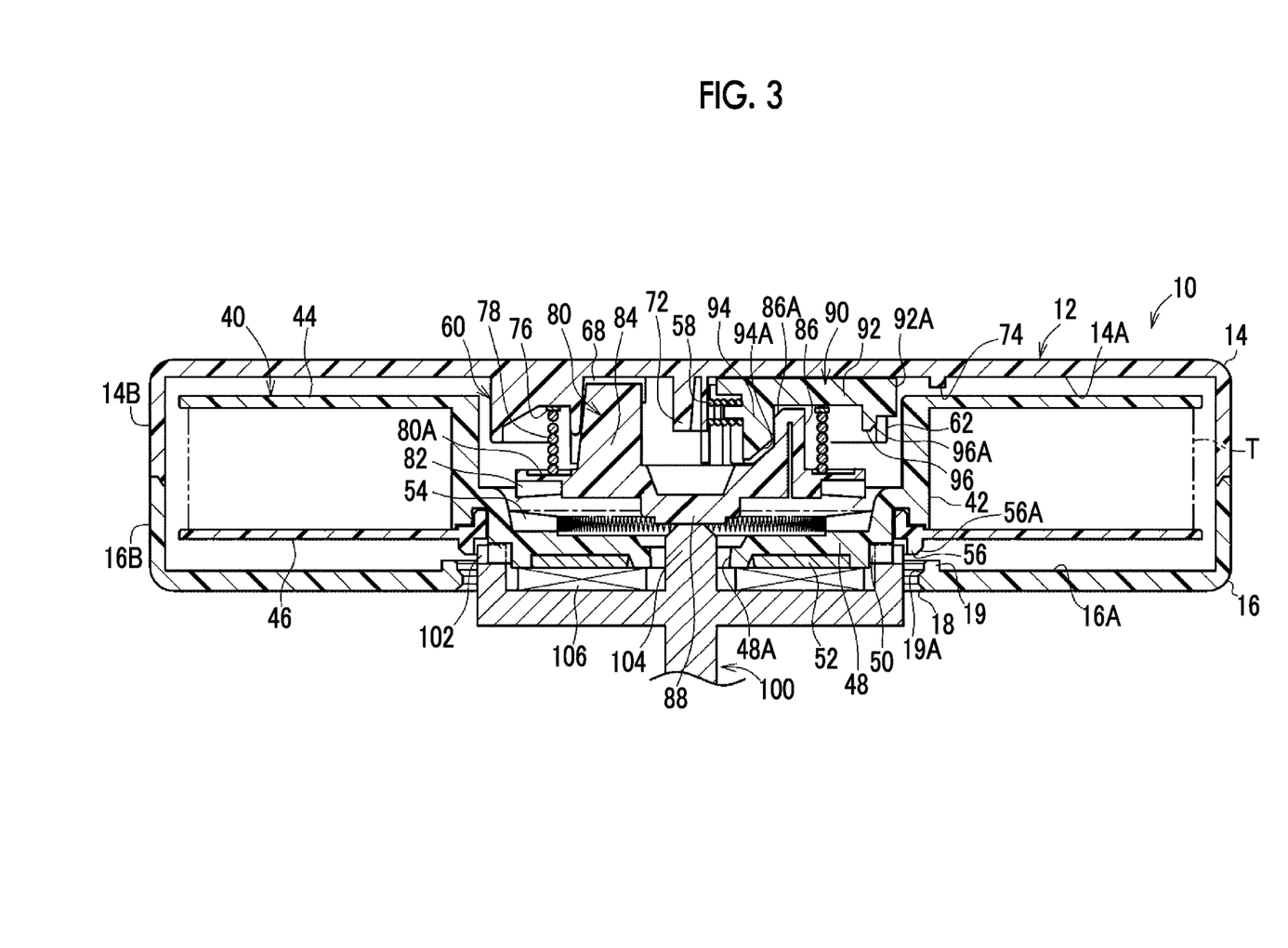
FIG. 3 is a side cross-sectional view of the recording tape cartridge in a case in which the rotating shaft has risen.

An oscillation-regulating wall 38 (see FIG. 6) stands in the case 12, and only one reel 40 (see FIGS. 2 and 3) is rotatably housed inside the oscillation-regulating wall 38 in the radial direction. As shown in FIGS. 2 and 3, the reel 40 has a structure in which a bottomed cylindrical hub 42 forming a shaft center portion and an upper flange 44 provided at the upper end portion of the hub 42 are molded integrally with each other and a lower flange 46 is fixed to the lower end portion of the hub 42 by ultrasonic welding. Further, a recording tape T, such as a magnetic tape, as an information recording-reproducing medium is wound on the outer peripheral surface of the hub 42.

As shown in FIG. 1, an opening 20 through which the recording tape T wound around the reel 40 is led to the outside is formed near at a left front corner portion 12C of the recording tape cartridge 10. In detail, the opening 20 is formed across a front wall 12A and a left wall 12B adjacent to the corner portion 12C, and a leader tape 22 to which a free end portion of the recording tape T is joined and which is disposed substantially along the left wall 12B is lead out of the opening 20.

The corner portion, which is mentioned here, means a ridge portion at which the peripheral walls 14B and 16B of the substantially rectangular box-shaped case 12 cross each other substantially at a right angle or an obtuse angle in plan view. Accordingly, the corner portion 12C means a ridge portion at which the front wall 12A and the left wall 12B cross each other substantially at a right angle in plan view.

The leader tape 22 is a member to be led with which a lead member (not shown) of the drive device is engaged to lead the recording tape T, and a hole portion 22A with which the lead member of the drive device is engaged is formed near the tip of the leader tape 22. The lead member of the drive device is also formed in the shape of the same tape as the leader tape 22.

Further, protruding portions 22B, which protrude upward and downward, are formed on both sides of a portion of the leader tape 22 that is positioned slightly on the rear side of the tip of the hole portion 22A. The protruding portions 22B are received (inserted) in slot portions 24 that are formed on the inner surface of the upper case 14 and the inner surface of the lower case 16, respectively. Accordingly, the leader tape 22 is adapted to be held in the case 12.

Each of the slot portion 24 is a slit-shaped receiving portion that includes the left wall 12B and a regulation wall 23 standing so as to have a predetermined gap along the left wall 12B, and the rear end of the regulation wall 23 forms a rear wall 23B (see FIG. 6) that is consecutively installed integrally with the left wall 12B and closes the rear side. Accordingly, the leader tape 22 is disposed substantially along the left wall 12B in a state in which the positions of the protruding portions 22B of the leader tape 22 are regulated by the rear walls 23B.

Further, the front end of each regulation wall 23 is bent so as to substantially follow the shape of the case 12, and the front side of the slot portion 24 is opened so as to face the opening 20. Accordingly, since each of the protruding portions 22B is adapted to be capable of freely going in and out from the front side of the slot portion 24, the leading path of the leader tape 22 is ensured (the leader tape 22 is led).

Furthermore, the opening 20 of the case 12 is closed by a door 30 in a case in which the recording tape cartridge 10 is not used. The door 30 has substantially the same shape and size as the opening 20 and is formed in a substantially "L" shape in plan view. A tip portion 30C of the door 30 corresponding to the left wall 12B is formed in a substantially trapezoidal shape in side view.

Moreover, protrusions 30D, which are in contact with the front surfaces 23A (see FIG. 6) of the regulation walls 23 bent toward the front wall 12A when the opening 20 is closed, are integrally formed on the inner surface of the door 30 at upper and lower portions of a left portion of the bent portion of the door 30. It is preferable that the door 30 is molded with an olefin resin, such as polyacetal (POM), but the door 30 may be molded with a resin, such as polycarbonate (PC), or metal, such as stainless steel (SUS).

Further, a support shaft 26, which serves as the fulcrum of the door 30, protrudes from the upper and lower cases 14 and 16 so as to be close to the front wall 12A. A portion of the support shaft 26 corresponding to the upper case 14 is formed of a cylindrical boss (not shown), and a portion thereof corresponding to the lower case 16 is formed of a two-stepped columnar protruding shaft (not shown). A tip portion of the protruding shaft corresponding to the lower case 16 is fitted to a hole portion of the boss corresponding to the upper case 14, so that the support shaft 26 is formed.

Furthermore, three flat plate-like rotating-sliding portions 32 protrude in parallel with each other from the inner surface of the door 30 near the right end of the door 30 (at a position deviated to the left from the right end portion of the door by a predetermined distance). The rotating-sliding portions 32 protrude from both upper and lower end portions of the inner surface of the door 30 and an intermediate portion slightly deviated downward from the middle of the door, respectively, and a through hole to which the support shaft 26 is loosely fitted is formed in each of the rotating-sliding portions 32. Accordingly, the support shaft 26 is inserted into the respective through holes, so that the door 30 is supported to be capable of moving rotationally.

Further, an annular protrusion 34 is formed around the through hole on each of the upper surface of the rotating-sliding portion 32 close to the upper end portion and the lower surface of the rotating-sliding portion 32 close to the lower end portion. The annular protrusions 34 are in contact with the upper and lower cases 14 and 16, so that a gap in the range of about 0.3 mm to 0.5 mm is formed between an upper end face 30A of the door 30 and the upper case 14 and between a lower end face 30B of the door 30 and the lower case 16.

Furthermore, bulging portions 36, which have an arc shape substantially along the peripheral surface of the support shaft 26 in plan cross-sectional view, are formed on the inner surface of the door 30 between the rotating-sliding portions 32. Moreover, a coil portion 28A of a torsion spring 28, which always biases the door 30 in a direction in which the opening 20 is closed, is fitted to the support shaft 26. That is, the coil portion 28A of the torsion spring 28 is fitted and mounted on the protruding shaft in a state in which the coil portion 28A of the torsion spring 28 is held between the rotating-sliding portion 32 corresponding to the lower end portion and the rotating-sliding portion 32 corresponding to the intermediate portion. One end portion 28B (see FIG. 6) of the torsion spring 28 is locked to a screw boss 15 of the case 12, and the other end portion thereof is locked to the right end edge portion of the bulging portion 36.

The reel 40 is molded with a resin material in which 20% of glass fiber (GF) is added to polycarbonate (PC). As shown in FIGS. 2 and 3, the reel 40 includes the bottomed cylindrical hub 42, the upper flange 44 that extends integrally with the upper end portion of the hub 42, and the lower flange 46 that is mounted on the lower end portion of the hub 42 by welding or the like.

Accordingly, since the hub 42 and the lower flange 46 are molded with resin materials compatible to each other, the hub 42 and the lower flange 46 can be joined to each other by ultrasonic welding or the like. Further, an interval between the upper and lower flanges 44 and 46 is substantially equal to the width of the recording tape T, and the position of the recording tape T, which is wound around the hub 42, in a width direction is regulated by the upper and lower flanges 44 and 46.

Furthermore, as shown in FIGS. 2 and 3, a bottom wall 48 is provided at a portion of the hub 42 corresponding to the lower flange 46, and a through hole 48A is formed at a shaft center (center) portion of the bottom wall 48. A reel gear 50 is annularly formed on the lower surface of the bottom wall 48. The reel 40 is pushed toward the lower case 16 by the biasing force of a compression coil spring 78, so that the reel gear 50 is exposed from a circular gear opening 18 provided substantially at the center of the lower case 16, meshes with a drive gear 102 provided on a rotating shaft 100 of the drive device, and transmits rotational power to the reel 40.

Further, an annular rib 19 stands upward (toward the inside of the case 12) at the peripheral edge of the gear opening 18, and a tapered surface 19A (see FIG. 3) is formed on the inner peripheral surface of the annular rib 19 (the peripheral surface of the annular rib 19 facing the gear opening 18). Furthermore, an annular rib 56, which faces the lower side, stands on the lower surface of the reel 40 (the lower flange 46) outside the reel gear 50 in the radial direction, and a tapered surface 56A is formed on the outer peripheral surface of the annular rib 56. Accordingly, since the tapered surface 56A of the annular rib 56 is in surface contact with the tapered surface 19A of the annular rib 19 in a case in which the recording tape cartridge 10 is not used, the reel 40 is positioned and supported by the lower case 16 (the case 12).

Further, an annular reel plate 52 made of a magnetic material is integrally fixed inside the reel gear 50 in the radial direction by insert molding or the like. Since the reel plate 52 is attracted by the magnetic force of an annular magnet 106, which is provided between the drive gear 102 and a release projection 104, in a state in which the drive gear 102 and the reel gear 50 completely mesh with each other, core misalignment (axial misalignment) between the reel 40 and the rotating shaft 100 can be prevented and a state in which the reel gear 50 and the drive gear 102 mesh with each other can be kept. Due to this structure, the reel 40 is rotated integrally with the rotating shaft 100 in the case 12 in a case in which the rotating shaft 100 is rotated about the shaft center thereof.

Furthermore, since an engagement gear 54 is annularly formed on the upper surface of the bottom wall 48 of the hub 42, the engagement gear 54 can mesh with a brake gear 82 of a brake member 80. The brake member 80 is formed in the shape of a circular disc that is housed in the hub 42 in the radial direction so as to be movable up and down (movable in the direction of the rotation axis of the reel 40), and the brake gear 82 is annularly formed on the outer peripheral portion of the lower surface of the brake member 80.

Figure 4:
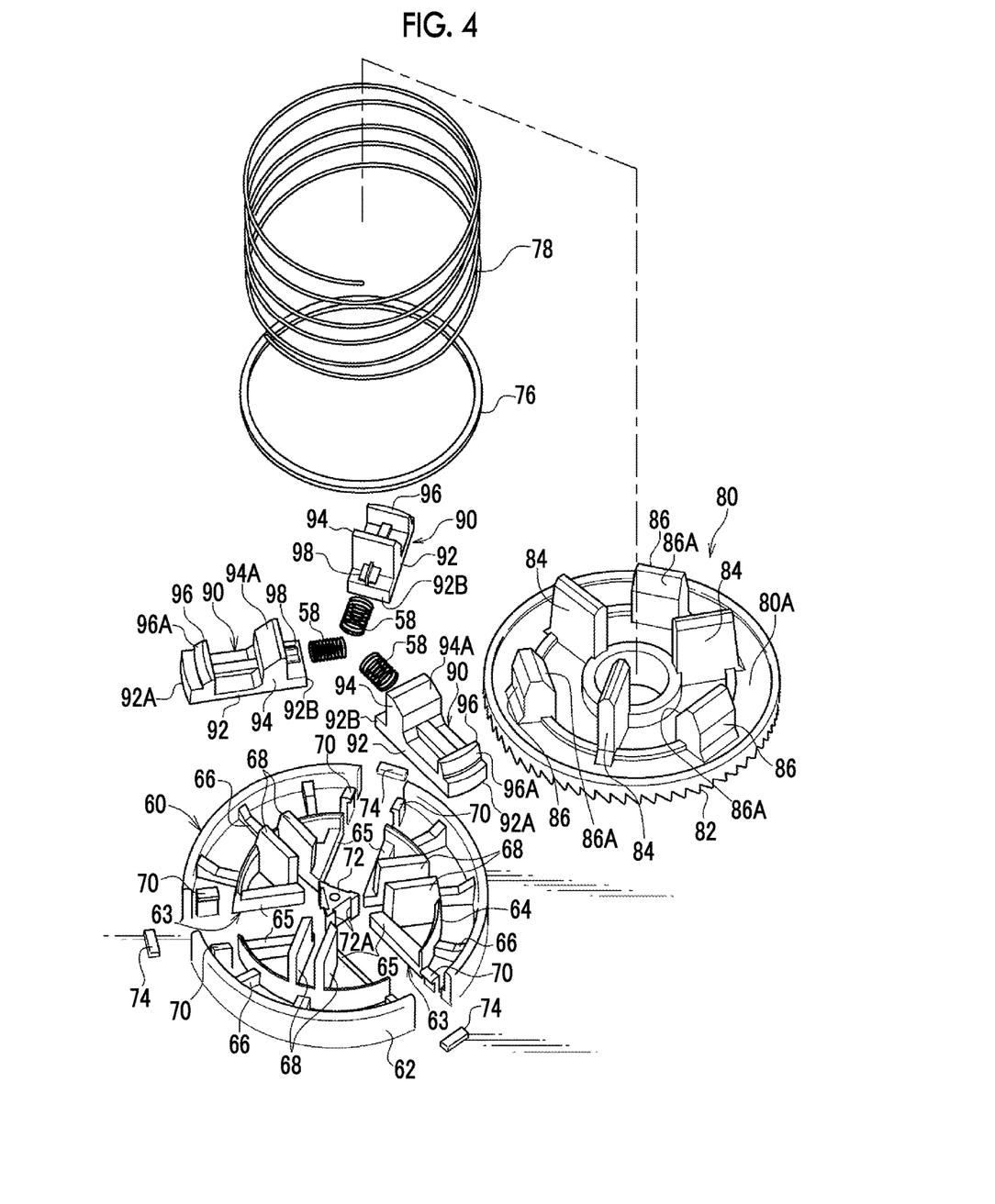
FIG. 4 is an exploded perspective view showing the structure of a mounting portion that is formed in an upper case.

As shown in FIG. 4, three plate-like protruding wall portions 84 that are to be inserted between guide wall portions 68 of the upper case 14 and three substantially prismatic engagement projections 86 that are engaged with cam portions 94 of three locking members 90 alternately stand on the upper surface of the brake member 80 at regular intervals in a circumferential direction.

Upper end portions of the surfaces, which face inward in the radial direction, of the engagement projections 86 are formed of tapered surfaces 86A that are inclined with respect to the direction of the rotation axis of the reel 40 by an angle of 30° to 60°, preferably, 45°, and the tapered surfaces 86A are engaged with the tapered surfaces 94A that are formed on the cam portions 94 of the locking members 90.

Further, since a flat surface 80A is annularly formed outside the protruding wall portions 84 and the engagement projections 86 in the radial direction on the upper surface of the brake member 80, the lower end of the compression coil spring 78 as a biasing member is in contact with the flat surface 80A in a case in which the recording tape cartridge 10 (the case 12) is assembled.

Furthermore, as shown in FIGS. 2 and 3, a substantially columnar operating projection 88, which can be inserted into the through hole 48A, protrudes on the center of the lower surface of the brake member 80, and the release projection 104 protruding on the shaft center portion of the rotating shaft 100 of the drive device can be in contact with the operating projection 88. Since the operating projection 88 protrudes so as to have a height that allows the operating projection 88 not to protrude downward from the through hole 48A (from the bottom wall 48) (a height that allows the operating projection 88 to be positioned in the through hole 48A), the brake member 80 is adapted not to unexpectedly move upward.

Figure 5:
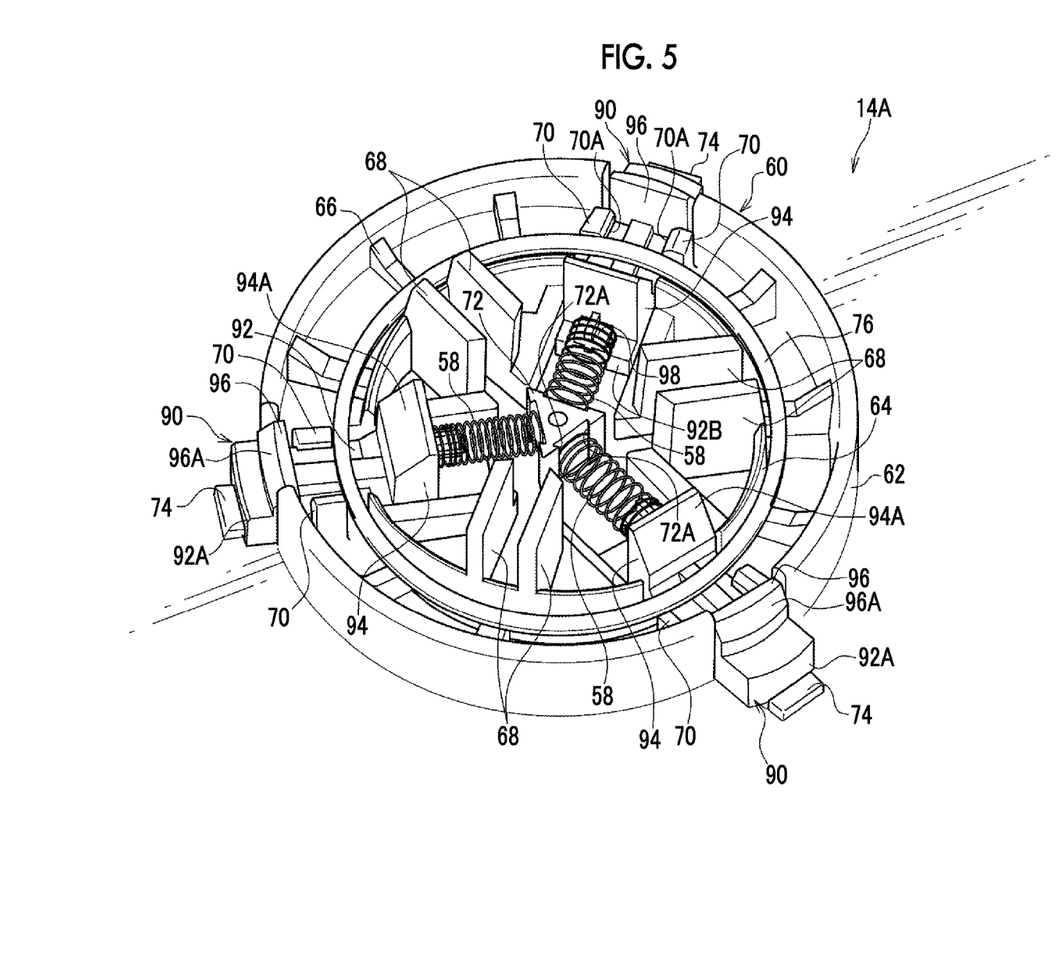
FIG. 5 is a perspective view of the mounting portion that is formed in the upper case.

Further, as shown in FIGS. 4 and 5, a mounting portion 60 is formed substantially at the center of the inner surface of the top plate 14A of the upper case 14 (above the shaft center portion of the hub 42). Three locking members 90, which are engaged with an upper edge portion of the hub 42 from the inner peripheral surface side of the upper edge portion of the hub 42 and prevent the reel 40 from moving in the direction of the rotation axis of the reel 40 (a vertical direction), are slidably mounted on the mounting portion 60.

The mounting portion 60 includes two cylindrical walls 62 and 64. The cylindrical walls 62 and 64 stand concentrically in plan view, and are formed so that the cylindrical wall provided on the outer side in the radial direction is higher than the cylindrical wall provided on the inner side in the radial direction. Further, the cylindrical walls 62 and 64 are notched at three positions that are arranged at regular intervals in the circumferential direction, and guide ribs 65 (see FIG. 4) stand in the radial direction inside the cylindrical wall 64 at the notched portions. Further, the locking members 90 are housed in housing portions 63 (see FIG. 4) formed between the guide ribs 65, and are adapted to be slidable in the radial direction.

Further, a plurality of (nine in this embodiment) plate-like support ribs 66 stand in the radial direction between the cylindrical walls 62 and 64 so as to connect the cylindrical wall 62 to the cylindrical wall 64. Furthermore, three sets, of which the number is the same as the number of the protruding wall portions 84, of two guide wall portions 68 between which the protruding wall portions 84 of the brake member 80 are to be inserted protrude between the respective housing portions 63 and inside the cylindrical wall 64.

Figure 6:
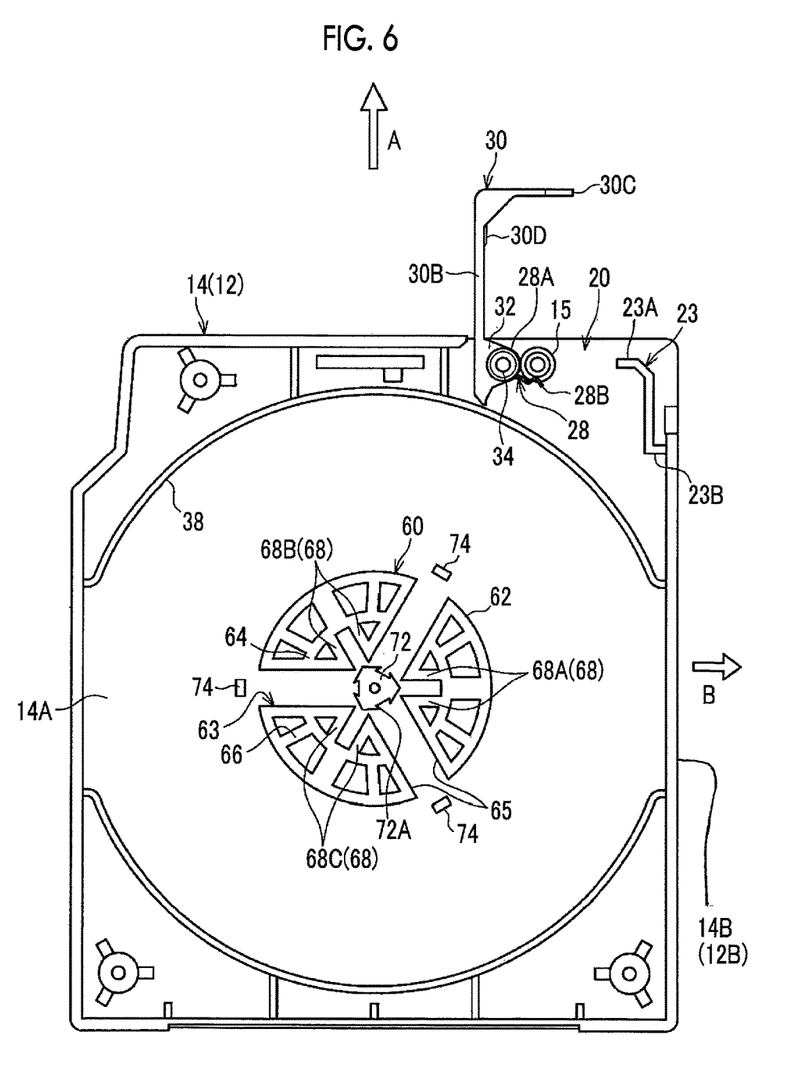
FIG. 6 is a bottom view of the upper case.
Figure 7:
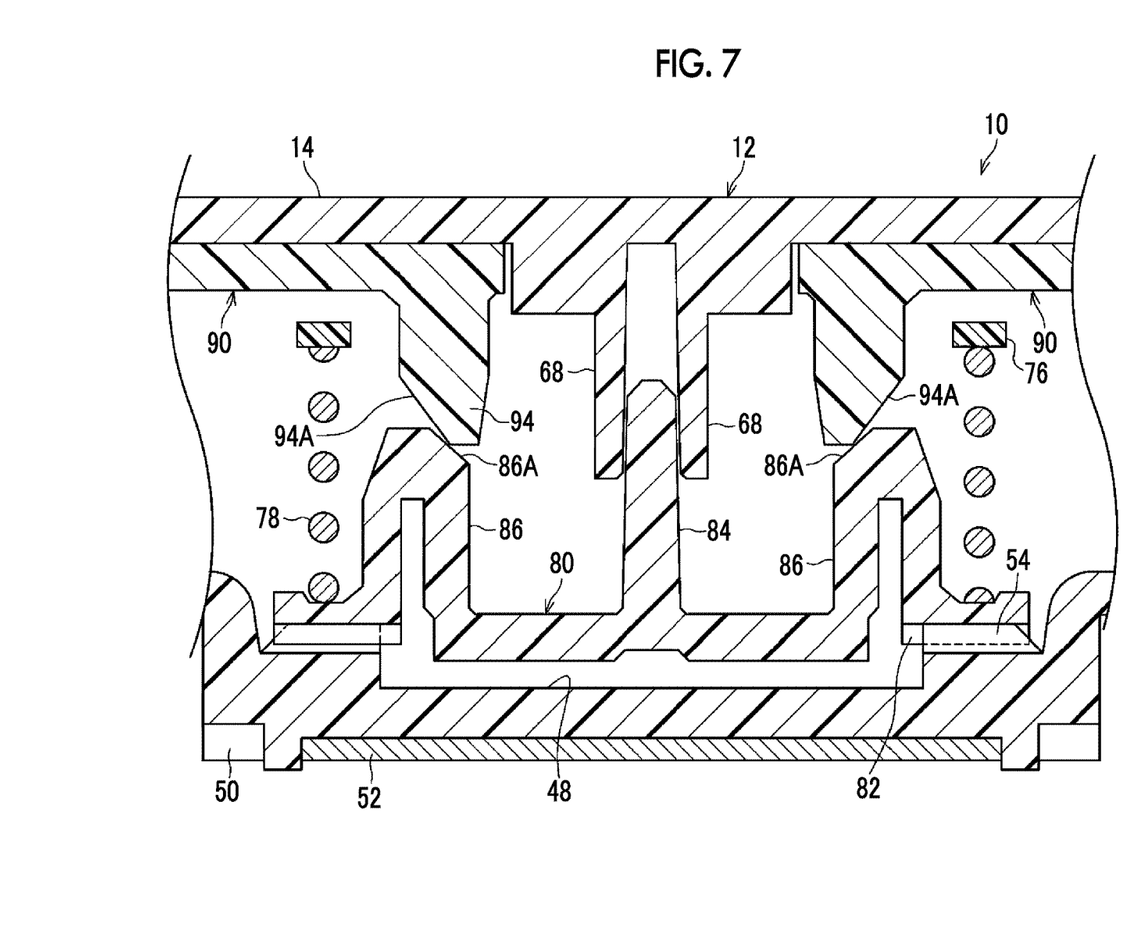
FIG. 7 is a side cross-sectional view showing a protruding wall portion that is inserted between a set of two guide wall portions.
Figure 8:
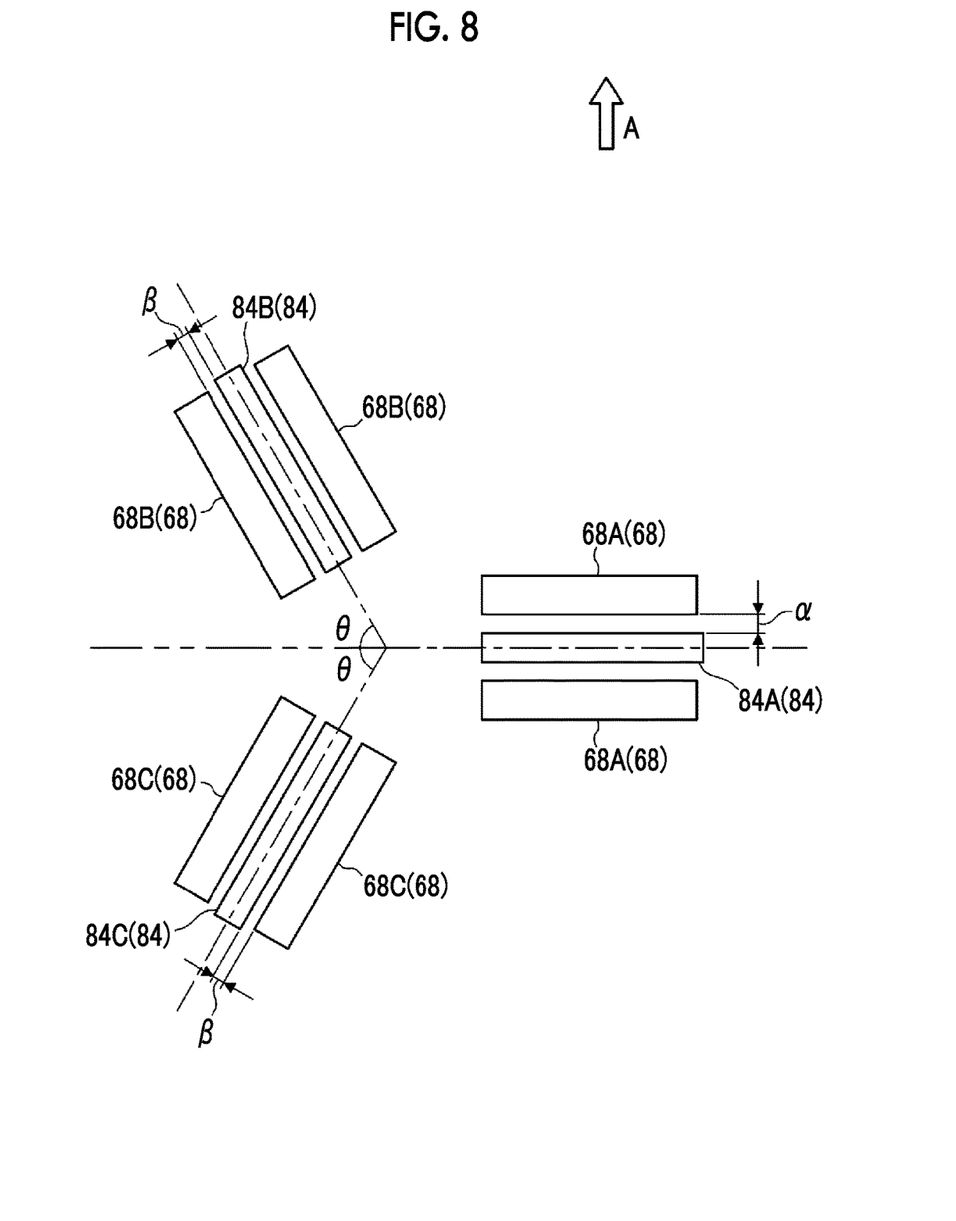
FIG. 8 is a schematic view showing a positional relationship between sets of two guide wall portions and protruding wall portions in bottom view.

The set of two guide wall portions 68 protrudes in the radial direction so that the outer end faces of the guide wall portions 68 are flush with the outer peripheral surface of the cylindrical wall 64, and an interval between each of the sets of guide wall portions 68 is set to be larger than the thickness of the protruding wall portion 84 as shown in FIGS. 7 and 8. Further, as shown in FIGS. 6 and 8, one set of guide wall portions 68 is formed in a direction (including a tolerance of 90°±2°) orthogonal to a loading direction in which the recording tape cartridge is loaded into the drive device. Holding portions 70 to be described below are not shown in FIG. 6.

Here, the guide wall portions 68, which are formed in the direction orthogonal to the loading direction in which the recording tape cartridge is loaded into the drive device, are referred to as first guide wall portions 68A, and the other guide wall portions 68 are referred to as second guide wall portions 68B and third guide wall portions 68C, respectively. Further, the protruding wall portion 84 to be inserted between the first guide wall portions 68A is referred to as a first protruding wall portion 84A, the protruding wall portion 84 to be inserted between the second guide wall portions 68B is referred to as a second protruding wall portion 84B, and the protruding wall portion 84 to be inserted between the third guide wall portions 68C is referred to as a third protruding wall portion 84C.

Furthermore, the first protruding wall portion 84A is disposed in the middle of a space between the first guide wall portions 68A, the second protruding wall portion 84B is disposed in the middle of a space between the second guide wall portions 68B, and the third protruding wall portion 84C is disposed in the middle of a space between the third guide wall portions 68C. That is, gaps, which are formed on both sides of the first protruding wall portion 84A and are formed between the first protruding wall portion 84A and the first guide wall portions 68A, are equal to each other; gaps, which are formed on both sides of the second protruding wall portion 84B and are formed between the second protruding wall portion 84B and the second guide wall portions 68B, are equal to each other; and gaps, which are formed on both sides of the third protruding wall portion 84C and are formed between the third protruding wall portion 84C and the third guide wall portions 68C, are equal to each other.

In this case, an interval α between one first guide wall portion 68A of the set of two first guide wall portions 68A and the first protruding wall portion 84A and an interval β between one second guide wall portion 68B of the set of two second guide wall portions 68B and the second protruding wall portion 84B or an interval β between one third guide wall portion 68C of the set of two third guide wall portions 68C and the third protruding wall portion 84C satisfy a relationship of "α≥2×β" as shown in FIG. 8.

Further, in a case in which each of the inclination angles of the second and third guide wall portions 68B and 68C with respect to the direction orthogonal to the loading direction in which the recording tape cartridge is loaded into the drive device is denoted by θ in a bottom view shown in FIG. 8 (when seen in the direction of the rotation axis of the reel 40), the interval α and the interval β satisfy a relationship of "α>β/cos θ(α>β/sin (90°−θ))".

That is, the first guide wall portions 68A protrude at predetermined positions on the inner surface of the top plate 14A of the upper case 14 so that an interval between the first guide wall portions 68A is larger than an interval between the second guide wall portions 68B and an interval between the third guide wall portions 68C in a state in which the first protruding wall portion 84A, the second protruding wall portion 84B, and the third protruding wall portion 84C have the same thickness (for example, 2.0 mm) and the first guide wall portion 68A, the second guide wall portion 68B, and the third guide wall portion 68C have the same thickness (for example, 1.5 mm).

The second and third guide wall portions 68B and 68C may protrude at predetermined positions on the inner surface of the top plate 14A of the upper case 14 so that the interval between the second guide wall portions 68B and the interval between the third guide wall portions 68C are smaller than the interval between the first guide wall portions 68A in a state in which the first protruding wall portion 84A, the second protruding wall portion 84B, and the third protruding wall portion 84C have the same thickness and the first guide wall portion 68A, the second guide wall portion 68B, and the third guide wall portion 68C have the same thickness.

Further, the thickness of the second guide wall portion 68B and the thickness of the third guide wall portions 68C may be larger than the thickness of the first guide wall portion 68A in a state in which the first protruding wall portion 84A, the second protruding wall portion 84B, and the third protruding wall portion 84C have the same thickness. Furthermore, the thickness of the second protruding wall portion 84B and the thickness of the third protruding wall portion 84C may be larger than the thickness of the first protruding wall portion 84A in a state in which the interval between the first guide wall portions 68A, the interval between the second guide wall portions 68B, and the interval between the third guide wall portions 68C are equal to each other.

The interval α of this embodiment is the minimum interval that is unambiguously obtained from the first guide wall portions 68A and the first protruding wall portion 84A. Accordingly, in a case in which, for example, the surfaces of the first guide wall portions 68A facing each other are formed of tapered surfaces between which an interval becomes narrow toward the inner surface of the top plate 14A, the interval α is the interval obtained on the inner surface of the top plate 14A.

Likewise, the interval β of this embodiment is the minimum interval that is unambiguously obtained from the second guide wall portions 68B and the second protruding wall portion 84B, and is the minimum interval that is unambiguously obtained from the third guide wall portions 68C and the third protruding wall portion 84C. Accordingly, in a case in which, for example, the surfaces of the second and third guide wall portions 68B and 68C facing each other are formed of tapered surfaces between which an interval becomes narrow toward the inner surface of the top plate 14A, the interval β is the interval obtained on the inner surface of the top plate 14A.

Further, a pair of holding portions 70, which holds each locking member 90 so as to allow each locking member 90 to be slidable (with a small gap), protrudes between the cylindrical walls 62 and 64 on both sides of each housing portion 63 (on the extensions of the guide ribs 65). Undercut portions 70A, which extend toward the inside (the locking member 90) so as to face each other, are formed at the tips (lower ends) of the holding portions 70.

Furthermore, in a case in which the upper case 14 is turned over so that the inner surface of the top plate 14A faces down after the assembly of the locking members 90 and is made to cover the lower case 16 (in a case in which the case 12 is assembled), the undercut portions 70A temporarily press the locking members 90 so that the locking members 90 do not fall out of (are not separated from) at least the mounting portion 60 (the housing portions 63).

Moreover, a locking projection 72, which holds one end of each coil spring 58, protrudes substantially at the center of the inner surface of the top plate 14A (which is position on the axis of the hub 42, the center of the mounting portion 60). Since three coil springs 58 are provided for the respective locking members 90, the respective locking members 90 are always biased to the outside from the center of the mounting portion 60 (the center of the reel 40) in the radial direction.

The locking projection 72 is formed in the shape of a substantially equilateral triangular prism so as to be capable of simultaneously holding the three coil springs 58. A pair of locking claws 72A, which can lock and hold a portion of the coil spring 58 corresponding to one turn from both sides, are formed at both end portions of each of three side surfaces of the locking projection 72 over the entire height of the locking projection 72. A projection portion (not shown), to which one end of each coil spring 58 is to be fitted, may protrude outward in the radial direction on each side surface of the locking projection 72 so as to have a predetermined length.

Further, stopper ribs 74, which temporarily (until the upper case 14 is made to cover the lower case 16) stop the locking members 90 biased by the coil springs 58 in a case in which the locking members 90 and the coil springs 58 are assembled, protrude on the top plate 14A at predetermined positions (positions to which tension to be described below is applied to some extent) that are present on the extensions of the housing portions 63 and outside the cylindrical wall 62 in the radial direction.

Accordingly, each of the locking members 90 is adapted to be held in a state in which tension is applied to the locking member 90 to some extent by the coil spring 58 and the stopper rib 74. Therefore, since the locking member 90 is adapted so that the falling of the locking member 90 is further prevented, the locking member 90 is adapted so that the assemblability of the locking member 90 to the mounting portion 60 is improved.

Furthermore, after the locking members 90 are temporarily pressed and held by the holding portions 70, a ring-shaped stopper 76 made of a resin and serving as a falling preventing member, which presses and holds the locking members 90 so that the locking members 90 are not separated even though sliding, is joined to the support ribs 66 by ultrasonic welding or the like. A clearance in the range of about 0.05 mm to 0.4 mm is ensured between the stopper 76 and each locking member 90 so that the sliding of each locking member 90 is not obstructed; and the height of each support rib 66 is prescribed so that the clearance is ensured.

Further, the upper end of the compression coil spring 78 is in contact with the stopper 76 in a case in which the recording tape cartridge 10 is assembled (in a case in which the upper case 14 is made to cover the lower case 16). That is, the compression coil spring 78 is adapted to be held between the stopper 76 (the upper case 14) and the flat surface 80A (the brake member 80).

The disclosure is not limited to the structure in which the upper end of the compression coil spring 78 is in contact with the stopper 76. For example, the upper end of the compression coil spring 78 may be in contact with the support ribs 66. Further, the stopper 76 is not limited to the shape of a ring shown in FIG. 5, and may be provided between the support ribs 66 provided on both sides of at least each locking member 90 so that the falling of the locking members 90 can be always prevented. Furthermore, in a case in which the stopper 76 is merely provided, the holding portions 70 may be omitted or the stopper 76 may be omitted and only the holding portions 70 may be provided.

The locking members 90 are held in the housing portions 63 so as to be slidable in the radial direction in a state in which the falling of the locking members 90 are prevented by the holding portions 70, the stopper 76, and the like. The locking member 90 includes a substantially prismatic body portion 92 that is in sliding contact with the inner surface of the top plate 14A of the upper case 14. Further, a substantially prismatic cam portion 94 having the same width as the body portion 92 protrudes near a radially inner end portion 92B of the body portion 92 so as to be perpendicular to the body portion 92 (in the direction of the rotation axis of the reel 40).

A fitting portion 98, which has a cross shape in cross-sectional view and to which the other end of the coil spring 58 is fitted, protrudes inward in the radial direction on the surface of the cam portion 94, which faces inward in the radial direction, so as to have a predetermined length. Since the outer diameter of the fitting portion 98 is slightly larger than the inner diameter of the coil spring 58, the coil spring 58 is not separated from the fitting portion 98. Further, in the body portion 92, the radially inner end portion 92B extends inward from the cam portion 94 in the radial direction so as to have a predetermined length (so as to be slightly longer than the fitting portion 98).

Accordingly, the locking member 90 can be made so that the center of gravity of the locking member 90 is low; and it is possible to further prevent the locking member 90 from running out of the mounting portion 60 (the housing portion 63) due to the tension of the coil spring 58 in a case in which the locking member 90 and the coil spring 58 are assembled to the mounting portion 60 (the housing portion 63) and are held between the locking projection 72 and the stopper rib 74. That is, the assemblability of the locking members 90 and the coil springs 58 can be further improved by this structure.

Furthermore, the lower end portions of the surfaces of the cam portions 94, which face outward in the radial direction, are formed of tapered surfaces (cam surfaces) 94A that are inclined with respect to the direction of the rotation axis of the reel 40 by an angle of 30° to 60°, preferably, 45°, and the tapered surfaces 94A are engaged with the tapered surfaces 86A of the engagement projections 86 of the brake member 80. Particularly, since the engagement projections 86 and the cam portions 94 are formed in a substantially prismatic shape, the engagement projections 86 and the cam portions 94 have high stiffness and can be successfully engaged with each other.

Further, the thickness D of an end portion, which is positioned on the outer side in the radial direction (on the outer side of an engagement portion 96 to be described below in the radial direction), (hereinafter, referred to as an "outer end portion") 92A of the locking member 90 (the body portion 92) is substantially equal to a distance W between the upper surface of the upper flange 44 and the inner surface of the top plate 14A in a case in which the reel 40 is positioned at the lowest position in the case 12 (see FIG. 2).

Furthermore, an engagement portion 96 having a predetermined height, which is to be engaged with the upper edge portion of the hub 42, protrudes near the outer end portion 92A of the body portion 92 so as to be perpendicular to the body portion 92 (in the direction of the rotation axis of the reel 40). The engagement portion 96 protrudes to have the same width as the body portion 92 and to be lower than the cam portion 94, and the lower end portion of a surface, which faces outward in the radial direction, (hereinafter, referred to an "outer surface") of the engagement portion 96 is formed of a tapered surface 96A that is inclined at a predetermined angle. Moreover, the shape of the outer surface, which includes the tapered surface 96A, is the shape of an arc surface coinciding with the inner peripheral surface of the hub 42 in plan view.

Accordingly, the locking member 90, which is temporarily stopped by the stopper rib 74, is adapted so that the engagement portion 96 is easily engaged with the upper edge portion of the hub 42 with the operation of the locking member 90 in a case in which the recording tape cartridge 10 is assembled (in a case in which the upper case 14 is made to cover the lower case 16) and the outer end portion 92A of the body portion 92 is spaced from the stopper rib 74 after the engagement (see FIG. 2).

In a case in which the recording tape cartridge 10 is not used, the engagement projections 86 and the cam portion 94 are not in contact with each other so that a component of the force of the coil spring 58 does not act on the brake member 80. Further, a clearance between the tapered surfaces 86A and 94A, which face each other, of the engagement projections 86 and the cam portion 94 in the direction of the rotation axis of the reel 40 (the direction of movement of the brake member 80) is set to be smaller than a mesh distance between the brake gear 82 and the engagement gear 54 (in other words, than the rising stroke of the brake member 80 until the mesh between the brake gear 82 and the engagement gear 54 is released).

The reason for this is that, when an impact is applied to the recording tape cartridge due to, for example, falling or the like in a case in which the clearance is larger than the mesh distance, the brake member 80 rises by the clearance and the reel 40 can be unexpectedly rotated. Accordingly, the clearance between the engagement projections 86 and the cam portion 94 is set to be smaller than the mesh distance between the brake gear 82 and the engagement gear 54, so that the reel 40 and brake member 80 cannot rise (cannot move in the direction of the rotation axis of the reel 40) substantially in a case in which the recording tape cartridge 10 is not used.

The action of the recording tape cartridge 10 having the above-mentioned structure will be described below.

In a case in which the recording tape cartridge 10 is not used (while the recording tape cartridge 10 is not loaded into the drive device), the door 30 closes the opening 20 by the biasing force of the torsion spring 28. Further, the protruding portions 22B of the leader tape 22 are received (inserted) and held in the slot portions 24, so that the leader tape 22 is disposed substantially along the left wall 12B.

Further, as shown in FIG. 2, the reel 40 is biased downward through the brake member 80 by the compression coil spring 78. That is, the brake member 80 is biased downward by the biasing force of the compression coil spring 78, so that the brake gear 82 of the brake member 80 meshes with the engagement gear 54 provided in the hub 42. Furthermore, since each protruding wall portion 84 is inserted between the respective guide wall portions 68, the unexpected rotation of the reel 40 with respect to the case 12 is prevented through the brake member 80.

Moreover, the locking members 90 are biased outward from the center of the mounting portion 60 (the center of the reel 40) in the radial direction by the biasing forces of the coil springs 58, and the engagement portions 96 of the locking members 90 are engaged with the upper edge portion of the hub 42. That is, the outer surfaces of the engagement portions 96 except for the tapered surfaces 96A press the inner peripheral surface of the hub 42, and the outer end portions 92A of the body portions 92 are interposed between the upper surface of the upper flange 44 and the inner surface of the top plate 14A.

Here, the thickness D of the outer end portion 92A of the locking member 90 (the body portion 92) is substantially equal to a distance W between the upper surface of the upper flange 44 and the inner surface of the top plate 14A in a case in which the reel 40 is positioned at the lowest position in the case 12. Accordingly, the rise of the reel 40 is prevented by the locking members 90.

Further, a clearance between the cam portion 94 of the locking member 90 and the engagement projection 86 of the brake member 80 is set to be smaller than a mesh distance between the brake gear 82 and the engagement gear 54. Accordingly, even though an impact is applied to the recording tape cartridge 10 due to falling or the like, the brake member 80 (the reel 40) does not rise substantially. That is, the brake gear 82 is not separated from the engagement gear 54 and the recording tape T is not adversely affected.

In a case in which the recording tape cartridge 10 is to be used to record data on a recording tape T or to reproduce data recorded on the recording tape T, the recording tape cartridge 10 is loaded into the drive device. That is, the recording tape cartridge 10 is taken out of a library device (not shown) by a robot hand, and the recording tape cartridge 10 is inserted into a loading port (not shown) of the drive device from the front wall 12A.

Here, the interval α between the first guide wall portion 68A and the first protruding wall portion 84A and the interval β between the second guide wall portion 68B and the second protruding wall portion 84B or the interval β between the third guide wall portion 68C and the third protruding wall portion 84C satisfy a relationship of "α≥2× β" as shown in FIG. 8. Further, in a case in which each of the inclination angles of the second and third guide wall portions 68B and 68C with respect to the direction orthogonal to the loading direction in which the recording tape cartridge is loaded into the drive device is denoted by θ in a bottom view shown in FIG. 8, the interval α and the interval β satisfy a relationship of "α>β/cos θ".

Accordingly, even though the reel 40 is moved in a front-rear direction (a direction parallel to the loading direction) by an inertial force in a case in which the recording tape cartridge 10 is loaded into the drive device, the second protruding wall portion 84B and the third protruding wall portion 84C bump against (come into contact with) the second guide wall portion 68B and the third guide wall portion 68C, respectively, before the first protruding wall portion 84A bumps against (comes into contact with) the first guide wall portion 68A.

In a bottom view shown in FIG. 8, each of the second and third guide wall portions 68B and 68C is inclined at an angle θ with respect to a direction orthogonal to the loading direction in which the recording tape cartridge is loaded into the drive device. For this reason, even though the second and third protruding wall portions 84B and 84C bump in the front-rear direction (a direction parallel to the loading direction), a load thereof (the weight of the reel 40) is spread to the second and third guide wall portions 68B and 68C and is spread in a left-right direction (a direction orthogonal to the loading direction) by the second and third guide wall portions 68B and 68C.

Accordingly, even though an operation for loading the recording tape cartridge 10 into the drive device or an operation for taking the recording tape cartridge 10 out of the drive device is repeatedly performed, there is no concern that the second and third guide wall portions 68B and 68C may be damaged. Further, the concentration of the load (the weight of the reel 40) on the first guide wall portions 68A is also avoided. Accordingly, since the fatigue failure of (damage to) the first guide wall portions 68A can be suppressed or prevented, the durability of the first guide wall portions 68A can be ensured.

In a case in which the recording tape cartridge 10 is loaded into the drive device by a robot hand, an opening/closing member (not shown) of the drive device relatively is in contact with a relative right end portion (the right side of the support shaft 26) of the door 30 and presses the right end portion as the recording tape cartridge 10 is loaded. Accordingly, the door 30 is moved rotationally about the support shaft 26 against the biasing force of the torsion spring 28 and opens the opening 20.

In this case, a gap in the range of about 0.3 mm to 0.5 mm is formed between the upper end face 30A of the door 30 and the upper case 14 and between the lower end face 30B of the door 30 and the lower case 16 by the annular protrusions 34. That is, only the annular protrusions 34 of the door 30 are in contact with the upper and lower cases 14 and 16. Accordingly, the door 30 can be rotated with low sliding resistance.

In a case in which the door 30 is moved rotationally and the opening 20 is opened, the lead member (not shown) of the drive device approaches the opening 20 from the left wall 12B and is engaged with the hole portion 22A of the leader tape 22. In this case, since the leader tape 22 stands by in a state in which the leader tape 22 is close to the left wall 12B, the lead member can be reliably engaged with the hole portion 22A.

After the lead member is engaged with the hole portion 22A in this way, the lead member is spaced from the opening 20. Accordingly, the leader tape 22 is led out of the inside of the case 12. Further, the leader tape 22 led out of the inside of the case 12 is wound around a take-up reel (not shown) of the drive device.

Furthermore, the rotating shaft 100 of the drive device enters the recording tape cartridge 10 from the gear opening 18, and the release projection 104 comes into contact with the operating projection 88 and presses upward the operating projection 88. Then, the brake member 80 rises against the biasing force of the compression coil spring 78 and the engagement projections 86 come into contact with the cam portions 94 of the locking members 90 and press upward the cam portions 94.

Accordingly, the tapered surfaces 94A of the cam portions 94 slide on the tapered surfaces 86A of the engagement projections 86 and the locking members 90 start sliding on the inner surface of the top plate 14A (in the housing portions 63) toward the inside in the radial direction against the biasing forces of the coil springs 58. In this case, the locking members 90 can slide in a stable state without being separated from the housing portions 63 (the mounting portion 60) by the stopper 76 and the like.

In a case in which the locking members 90 start sliding in the housing portions 63 toward the inside in the radial direction in this way, the outer surfaces of the engagement portions 96 are spaced from the inner peripheral surface of the hub 42 and the outer end portions 92A of the body portions 92 start retreating from a space between the upper surface of the upper flange 44 and the inner surface of the top plate 14A. Then, the mesh between the engagement gear 54 and the brake gear 82 is released, the drive gear 102 starts meshing with the reel gear 50, and the outer end portions 92A of the body portions 92 completely retreat from the space between the upper surface of the upper flange 44 and the inner surface of the top plate 14A in a case in which a mesh distance between the reel gear 50 and the drive gear 102 reaches about the half of the tooth height of the reel gear.

That is, the outer end portions 92A of the body portions 92 are disposed inside the hub 42 in the radial direction, and the reel 40 starts rising (moving) by the rotating shaft 100. Then, in a case in which the drive gear 102 completely meshes with the reel gear 50 and the reel plate 52 is attracted by the magnet 106, the rotating shaft 100 further rises up to a predetermined height as shown in FIG. 3 but the cam portions 94 enter (fall into) a space inside the engagement projections 86 in the radial direction with the rise of the rotating shaft 100. Accordingly, the surfaces, which face outward in the radial direction, of the cam portions 94 come into contact with the surfaces, which face inward in the radial direction, of the engagement projections 86, so that the locking members 90 are kept in an unlocked state. Therefore, the reel 40 is rotationally driven at the predetermined height in the case 12.

That is, in a case in which the reel 40 (the reel gear 50) is rotationally driven in synchronization with the take-up reel by the rotating shaft 100 (the drive gear 102), the recording tape T is sequentially sent to the drive device and data is recorded on the recording tape T or data recorded on the recording tape T is reproduced by a recording-reproducing head (not shown) of the drive device.

The cam portions 94 enter the space inside the engagement projections 86 in the radial direction in a case in which the brake member 80 has risen, but the surfaces, which face outward in the radial direction, of the cam portions 94 merely come into contact with the surfaces, which face inward in the radial direction, of the engagement projections 86 in this case. Accordingly, the upper end faces of the engagement projections 86 are not in contact with the locking members 90 and the lower end faces of the cam portions 94 are also not in contact with the brake members 80. For this reason, since pressing forces (biasing forces) of the coil springs 58, which press the locking members 90, are received by the inner peripheral surfaces of the engagement projections 86, a component of the force pushing down the brake member 80 is not generated.

That is, during the rotation of the reel 40, the pressing forces (biasing forces) of the coil springs 58 act only in the radial direction of the reel 40 and do not act (are not transmitted) in the direction of the rotation axis of the reel 40 (the vertical direction). For this reason, the locking members 90 are stably kept in an unlocked state. Further, since only the biasing force of the compression coil spring 78 is a pressing force (biasing force) acting in the direction of the rotation axis of the reel 40 (the vertical direction) as in the related art, an unnecessary load is not applied in the direction of the rotation axis of the rotating shaft 100 (a downward direction) even in a structure in which the coil springs 58 are provided.

In a case in which the recording tape cartridge 10 is to be taken out of the drive device, the drive gear 102 is rotated in a reverse direction first to rewind the recording tape T around the reel 40. Then, the leader tape 22 is separated from the take-up reel and is returned into the case 12 from the opening 20. That is, the protruding portions 22B of the leader tape 22 are received (inserted) in the slot portions 24, so that the leader tape 22 is kept at a predetermined position in the case 12.

Next, the reel 40 starts being moved down through the downward movement of the rotating shaft 100, and the brake member 80 starts being moved down by the biasing force of the compression coil spring 78. Then, the locking members 90 start sliding in the housing portions 63 toward the outside in the radial direction by the biasing forces of the coil springs 58 with the downward movement of the brake member 80. That is, the tapered surfaces 94A of the cam portions 94 start sliding on the tapered surfaces 86A of the engagement projections 86.

Then, in a case in which the rotating shaft 100 is further moved down, the magnet 106 is spaced from the reel plate 52 and the mesh between the reel gear 50 and the drive gear 102 starts being released. After that, when a mesh distance between the reel gear 50 and the drive gear 102 reaches about the half of the tooth height of the reel gear, the outer end portions 92A of the locking members 90 (the body portions 92) start being interposed between the upper surface of the upper flange 44 and the inner surface of the top plate 14A.

That is, before the mesh between the reel gear 50 and the drive gear 102 is completely released (while the reel 40 is supported by the rotating shaft 100), the outer end portions 92A of the locking members 90 (the body portions 92) are interposed between the upper surface of the upper flange 44 and the inner surface of the top plate 14A, hold the reel 40 between themselves and the lower case 16, and prevents the rise of the reel 40.

After that, in a case in which the rotating shaft 100 is further moved down and the mesh between the reel gear 50 and the drive gear 102 is completely released, the engagement portions 96 are engaged with the upper edge portion of the hub 42. That is, the outer surfaces of the engagement portions 96 except for the tapered surfaces 96A press the inner peripheral surface of the hub 42 by the biasing forces of the coil springs 58.

Then, in a case in which the tapered surfaces 86A of the engagement projections 86 are spaced from the tapered surfaces 94A of the cam portions 94 and the release projection 104 is spaced from the operating projection 88, the brake member 80 is moved down to the lowest position by the biasing forces of the compression coil springs 78 and the brake gear 82 meshes with the engagement gear 54. Accordingly, the unexpected rotation of the reel 40 is prevented again, the upper surface of the reel 40 is pressed by the outer end portions 92A of the locking members 90 (the body portions 92) not to be capable of rising, and the annular rib 56 standing on the lower surface of the reel 40 is supported by the annular rib 19.

In a case in which the rotating shaft 100 is extracted from the gear opening 18 in this way, the recording tape cartridge 10 is discharged from the loading port of the drive device. However, the opening/closing member is spaced from the right end portion of the door 30 with an operation for discharging the recording tape cartridge 10. Then, the door 30 is moved rotationally about the support shaft 26 in a direction opposite to the above-mentioned direction by the biasing force of the torsion spring 28, and closes the opening 20. Further, the recording tape cartridge 10 of which the opening 20 is closed is discharged from the loading port of the drive device.

The recording tape cartridge 10, which is discharged from the loading port of the drive device, is taken out by a robot hand and is loaded (received) in the library device. Even in a case in which the recording tape cartridge 10 is loaded (received) in the library device, the reel 40 may be moved in the front-rear direction (a direction parallel to the loading direction) by the inertial force of the recording tape cartridge 10.

However, even in this case, the second protruding wall portion 84B and the third protruding wall portion 84C bump against (come into contact with) the second guide wall portion 68B and the third guide wall portion 68C, respectively, before the first protruding wall portion 84A bumps against (comes into contact with) the first guide wall portion 68A. Accordingly, even though an operation for taking the recording tape cartridge 10 out of the drive device and loading (receiving) the recording tape cartridge 10 into the library device is repeatedly performed, the fatigue failure of (damage to) the first guide wall portions 68A can be suppressed or prevented in the same manner as described above.

The recording tape cartridge 10 according to this embodiment has been described above with reference to the drawings. However, the recording tape cartridge 10 according to this embodiment is not limited to the recording tape cartridge shown in the drawings, and can be appropriately changed in design without departing from the scope of the disclosure. For example, each guide wall portion 68 may include two wall portions between which each protruding wall portion 84 is to be inserted, and may be a guide wall portion in which two wall portions are partially connected to each other.

Further, a case in which gaps, which are formed on both sides of each protruding wall portion 84 and are formed between the protruding wall portion and the guide wall portions 68, are equal to each other as shown in FIG. 8 has been described in this embodiment. However, even in a case in which, for example, each protruding wall portion 84 is obliquely inserted between the guide wall portions 68 (a case in which the gaps are not equal to each other), the interval $\alpha$ as the minimum value and the interval $\beta$ as the minimum value may satisfy a relationship of "$\alpha \geq 2 \times \beta$ or $\alpha > \beta / \cos \theta$".

Furthermore, in this embodiment, the coil spring 58 has been described as an example of biasing means for biasing the locking member 90 to the outside from the center of the reel 40 (the mounting portion 60) in the radial direction. However, the biasing means is not limited thereto, and may be formed of, for example, a leaf spring, a torsion spring, or the like. In a case in which the biasing means are disposed substantially at a center (the center of the mounting portion 60) portion on the inner surface of the top plate 14A, there are advantages that a dead space in the case 12 is effectively used and the biasing means can be made compact.

Moreover, the locking members 90 have been adapted to slide in the radial direction by being engaged with the brake member 80 in this embodiment, but a structure in which the locking members 90 slide in the radial direction is not limited thereto. For example, switching members for switching the locking members 90 to a lifting-locking position (a position at which the movement of the reel 40 in the direction of the rotation axis is prevented) and a lifting-locking release position (a position at which the movement of the reel 40 in the direction of the rotation axis is allowed) may be provided separately from the brake member 80. In this case, it is preferable that the switching members are adapted to operate in conjunction with the brake member 80.

What is claimed is:

1. A recording tape cartridge comprising:
    a reel that includes a bottomed cylindrical hub around which a recording tape is wound and a reel gear that is configured to mesh with a drive gear provided at a drive device;
    a case that houses the reel;
    a brake member that is disposed inside the hub in a radial direction, that is moved in a direction of a rotation axis of the reel in conjunction with an operation for allowing the drive gear to mesh with the reel gear and an operation for releasing mesh between the drive gear and the reel gear, and that takes a rotation-locking release position at which the rotation of the reel is allowed and a rotation-locking position at which the rotation of the reel is prevented;
    a first protruding wall portion that protrudes from the brake member and that is disposed along a direction orthogonal to a loading direction in which the case is loaded into the drive device, and a second protruding wall portion and a third protruding wall portion that protrude from the brake member and that are disposed at regular intervals from the first protruding wall portion in a circumferential direction of the brake member, when seen in the direction of the rotation axis of the reel; and
    a set of two first guide wall portions that is formed at an inner surface of a top plate of the case in the direction orthogonal to the loading direction in which the case is loaded into the drive device and between which the first protruding wall portion is insertable, and a set of two second guide wall portions and a set of two third guide wall portions that are formed at the inner surface of the top plate of the case at regular intervals from the first guide wall portions in the circumferential direction, the second protruding wall portion being insertable between the second guide wall portions, and the third protruding wall portion being insertable between the third guide wall portions, when seen in the direction of the rotation axis of the reel,
    wherein in a case in which an interval between each first guide wall portion and the first protruding wall portion is denoted by $\alpha$ and each of an interval between each second guide wall portion and the second protruding wall portion and an interval between each third guide wall portion and the third protruding wall portion is denoted by β, "α≥2×β" is satisfied.

2. A recording tape cartridge comprising:
a reel that includes a bottomed cylindrical hub around which a recording tape is wound and a reel gear that is configured to mesh with a drive gear provided at a drive device;
a case that houses the reel;
a brake member that is disposed inside the hub in a radial direction, that is moved in a direction of a rotation axis of the reel in conjunction with an operation for allowing the drive gear to mesh with the reel gear and an operation for releasing mesh between the drive gear and the reel gear, and that takes a rotation-locking release position at which the rotation of the reel is allowed and a rotation-locking position at which the rotation of the reel is prevented;
a first protruding wall portion that protrudes from the brake member and that is disposed along a direction orthogonal to a loading direction in which the case is loaded into the drive device, and a second protruding wall portion and a third protruding wall portion that protrude from the brake member and that are disposed at regular intervals from the first protruding wall portion in a circumferential direction of the brake member, when seen in the direction of the rotation axis of the reel; and
a set of two first guide wall portions that is formed at an inner surface of a top plate of the case in the direction orthogonal to the loading direction in which the case is loaded into the drive device and between which the first protruding wall portion is insertable, and a set of two second guide wall portions and a set of two third guide wall portions that are formed at the inner surface of the top plate of the case at regular intervals from the first guide wall portions in the circumferential direction, the second protruding wall portion being insertable between the second guide wall portions, and the third protruding wall portion being insertable between the third guide wall portions, when seen in the direction of the rotation axis of the reel,
wherein in a case in which an interval between each first guide wall portion and the first protruding wall portion is denoted by α, each of an interval between each second guide wall portion and the second protruding wall portion and an interval between each third guide wall portion and the third protruding wall portion is denoted by β, and each of inclination angles of the second and third guide wall portions with respect to the direction orthogonal to the loading direction in which the case is loaded into the drive device, when seen in the direction of the rotation axis of the reel, is denoted by θ, "α>β/cos θ" is satisfied.

3. The recording tape cartridge according to claim 1, wherein the first protruding wall portion, the second protruding wall portion, and the third protruding wall portion have the same thickness, and the first guide wall portions, the second guide wall portions, and the third guide wall portions have the same thickness.

4. The recording tape cartridge according to claim 1, wherein the first protruding wall portion, the second protruding wall portion, and the third protruding wall portion have the same thickness, and a thickness of each second guide wall portion and a thickness of each third guide wall portion are larger than a thickness of each first guide wall portion.

5. The recording tape cartridge according to claim 1, wherein an interval between the first guide wall portions, an interval between the second guide wall portions, and an interval between the third guide wall portions are equal to each other, and a thickness of the second protruding wall portion and a thickness of the third protruding wall portion are larger than a thickness of the first protruding wall portion.

6. The recording tape cartridge according to claim 1, further comprising:
locking members that are provided at regular intervals in the circumferential direction among the first guide wall portions, the second guide wall portions, and the third guide wall portions so as to be slidable in a radial direction of the reel, that take a lifting-locking position at which the locking members are interposed between the reel and the inner surface of the top plate of the case and prevent the movement of the reel in the direction of the rotation axis in a case in which the brake member takes the rotation-locking position, and that take a lifting-locking release position at which the locking members retreat from a space between the reel and the inner surface of the top plate of the case and allow the movement of the reel in the direction of the rotation axis in a case in which the brake member takes the rotation-locking release position.

7. The recording tape cartridge according to claim 2, wherein the first protruding wall portion, the second protruding wall portion, and the third protruding wall portion have the same thickness, and the first guide wall portions, the second guide wall portions, and the third guide wall portions have the same thickness.

8. The recording tape cartridge according to claim 2, wherein the first protruding wall portion, the second protruding wall portion, and the third protruding wall portion have the same thickness, and a thickness of each second guide wall portion and a thickness of each third guide wall portion are larger than a thickness of each first guide wall portion.

9. The recording tape cartridge according to claim 2, wherein an interval between the first guide wall portions, an interval between the second guide wall portions, and an interval between the third guide wall portions are equal to each other, and a thickness of the second protruding wall portion and a thickness of the third protruding wall portion are larger than a thickness of the first protruding wall portion.

10. The recording tape cartridge according to claim 2, further comprising:
locking members that are provided at regular intervals in the circumferential direction among the first guide wall portions, the second guide wall portions, and the third guide wall portions so as to be slidable in a radial direction of the reel, that take a lifting-locking position at which the locking members are interposed between the reel and the inner surface of the top plate of the case and prevent the movement of the reel in the direction of the rotation axis in a case in which the brake member takes the rotation-locking position, and that take a lifting-locking release position at which the locking members retreat from a space between the reel and the inner surface of the top plate of the case and allow the movement of the reel in the direction of the rotation axis in a case in which the brake member takes the rotation-locking release position.

* * * * *